(12) United States Patent
Ringler et al.

(10) Patent No.: US 12,454,045 B2
(45) Date of Patent: Oct. 28, 2025

(54) METHOD FOR ADJUSTING THE POWER OF A POWER TOOL

(71) Applicant: Hilti Aktiengesellschaft, Schaan (LI)

(72) Inventors: Stefan Ringler, Schwabmuehlhausen (DE); Ehsan Mahdizadeh, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/579,708

(22) PCT Filed: Jul. 20, 2022

(86) PCT No.: PCT/EP2022/070326
§ 371 (c)(1),
(2) Date: Jan. 16, 2024

(87) PCT Pub. No.: WO2023/006538
PCT Pub. Date: Feb. 2, 2023

(65) Prior Publication Data
US 2024/0316743 A1  Sep. 26, 2024

(30) Foreign Application Priority Data
Jul. 30, 2021 (EP) ..................................... 21188656

(51) Int. Cl.
*B25D 17/04* (2006.01)
(52) U.S. Cl.
CPC ...... *B25D 17/043* (2013.01); *B25D 2250/201* (2013.01); *B25D 2250/221* (2013.01); *B25D 2250/265* (2013.01)
(58) Field of Classification Search
CPC ............ B25D 17/043; B25D 2250/201; B25D 2250/221; B25D 2250/265
See application file for complete search history.

(56) References Cited

U.S. PATENT DOCUMENTS 3,231,809 A * 1/1966 Greer ........................ H02P 1/20
388/918
3,329,789 A * 7/1967 Sahrbacker ............ H01H 9/061
200/522

(Continued)

FOREIGN PATENT DOCUMENTS

EP 1136191 A2 9/2001
EP 3822031 A1 5/2021

OTHER PUBLICATIONS

ISR of PCT/EP2022/070326 dated Nov. 14, 2022.

*Primary Examiner* — Thanh K Truong
*Assistant Examiner* — David G Shutty
(74) *Attorney, Agent, or Firm* — Davidson Kappel LLC (57) ABSTRACT

Method for the open-loop and closed-loop control of a power tool containing a drive, a control device, a sensor, a transmission and a handle apparatus. The handle apparatus contains a lever element with a signal transmitter and pivotable relative to the sensor. A first and second position of the signal transmitter are sensed by the sensor, the distance between the first and second position corresponds to a first distance. The difference between a maximum distance of the lever element and the first determined distance is determined. A first rotational speed for the drive is set when the determined difference between the maximum distance of the lever element and the first determined distance corresponds at least to a first predetermined threshold value. A second rotational speed for the drive is set after the second position has been reached and after a predetermined period of time elapsed.

16 Claims, 4 Drawing Sheets

(56) References Cited

U.S. PATENT DOCUMENTS

| | | | | |
|---|---|---|---|---|
| 3,386,067 | A * | 5/1968 | Costanzo | H01H 36/00 327/384 |
| 3,753,066 | A * | 8/1973 | Sailer | H02P 7/288 318/257 |
| 4,454,459 | A * | 6/1984 | Huber | H02P 25/145 388/903 |
| 5,365,155 | A * | 11/1994 | Zimmermann | H01H 9/06 388/838 |
| 6,741,051 | B2 * | 5/2004 | Chu | H02P 7/29 173/15 |
| 7,320,368 | B2 * | 1/2008 | Watanabe | B25D 16/006 173/217 |
| 7,868,263 | B2 * | 1/2011 | Hammerstingl | B25F 5/02 200/332.2 |
| 8,657,808 | B2 * | 2/2014 | McPherson | A61B 17/1626 606/1 |
| 8,689,901 | B2 * | 4/2014 | Chen | H02P 23/20 173/217 |
| 9,314,855 | B2 * | 4/2016 | Ookubo | H02P 23/03 |
| 9,706,706 | B2 * | 7/2017 | Barendrecht | A01D 34/824 |
| 11,522,411 | B2 * | 12/2022 | Velderman | B25F 5/001 |
| 11,731,256 | B2 * | 8/2023 | Yamada | B25D 17/24 173/48 |
| 11,890,741 | B2 * | 2/2024 | Merget | H03K 17/97 |
| 11,897,110 | B2 * | 2/2024 | Merget | B25D 17/00 |
| 2001/0024601 | A1 * | 9/2001 | Miescher | B25F 5/001 408/199 |
| 2015/0328759 | A1 * | 11/2015 | Ikuta | B25D 11/04 173/179 |
| 2019/0047131 | A1 * | 2/2019 | Ichikawa | B25B 21/02 |
| 2021/0268636 | A1 * | 9/2021 | Braun | B25F 5/006 |

* cited by examiner

METHOD FOR ADJUSTING THE POWER OF A POWER TOOL

The present invention relates to a method for the open-loop and closed-loop control of a power tool, in particular a chipping hammer, containing a drive, a control device, a sensor device, a transmission device and a handle apparatus, wherein the handle apparatus contains a lever element with a signal transmitter, said lever element being pivotable relative to the sensor device.

BACKGROUND

A chipping hammer according to the prior art is used to work on (i.e. tear up, break up or chisel) mineral materials, for example concrete, brick or the like. The chipping hammer can also be referred to as a demolition hammer, mechanical pick, breaker or floor breaker. The chipping hammer has a drive, which, by means of a transmission mechanism, transmits strikes to a chisel tool (also known as a chisel). The drive may be an electric motor, hydraulic drive, pneumatic drive or combustion engine.

Generally, the chipping hammer has two handles, which are positioned on opposite sides of the housing of the chipping hammer. At least one of the two handles comprises an activation switch, with which the chipping hammer can be activated or switched on. The handles in this case extend usually at an obtuse angle to a longitudinal axis of the housing of the chipping hammer. In order to use the chipping hammer, the activation switch is pressed and the chipping hammer is activated such that strikes are transmitted to the chisel by the drive.

SUMMARY OF THE INVENTION

A problem with a chipping hammer according to the prior art is that a relatively inexperienced user can often have problems handling the chipping hammer. The power delivery and in particular the impact pulses may make it difficult to work safely and efficiently with the chipping hammer.

Therefore, it is an object of the present invention to solve the abovementioned problem and to provide a method for the open-loop and closed-loop control of a power tool, in particular a chipping hammer, which makes it possible to work safely and efficiently with a power tool, in particular with a chipping hammer.

The present invention provides a method for the open-loop and closed-loop control of a power tool, in particular a chipping hammer, containing a drive, a control device, a sensor device, a transmission device and a handle apparatus, wherein the handle apparatus contains a lever element with a signal transmitter, said lever element being pivotable relative to the sensor device.

According to the invention, the method comprises the method steps of:
  sensing a first and second position of the signal transmitter by the sensor device, wherein the distance between the first and second position corresponds to a first distance;
  determining the difference between a maximum distance of the lever element and the first determined distance;
  setting a first rotational speed for the drive when the determined difference between the maximum distance of the lever element and the first determined distance corresponds at least to a first predetermined threshold value; and
  setting a second rotational speed for the drive when a predetermined period of time has elapsed since the second position of the signal transmitter was reached.

The transmission device generates a first impact frequency and a first power delivery when a first rotational speed for the drive has been set. When a second rotational speed for the drive has been set, the transmission device generates a second impact frequency and a second power delivery. The higher the set rotational speed for the drive, the higher the generated impact frequency and the power delivery of the transmission device.

According to one advantageous configuration of the present invention, it may be possible that the first rotational speed for the drive corresponds to a predetermined proportion, in particular between 60 and 80%, for example 75% of the maximum rotational speed for the drive.

According to a further advantageous configuration of the present invention, it may be possible that that the threshold value for the determined difference between the maximum distance and the first determined distance of the lever element corresponds to a predetermined proportion, in particular between 25 and 75%, for example 50% of the maximum distance.

According to a further advantageous configuration of the present invention, it may be possible that the predetermined period of time corresponds to a value of between 0.75 and 2 seconds, and in particular 1 second.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

Identical and similar components are denoted by the same reference signs in the figures, in which.

DETAILED DESCRIPTION

Figure 1:
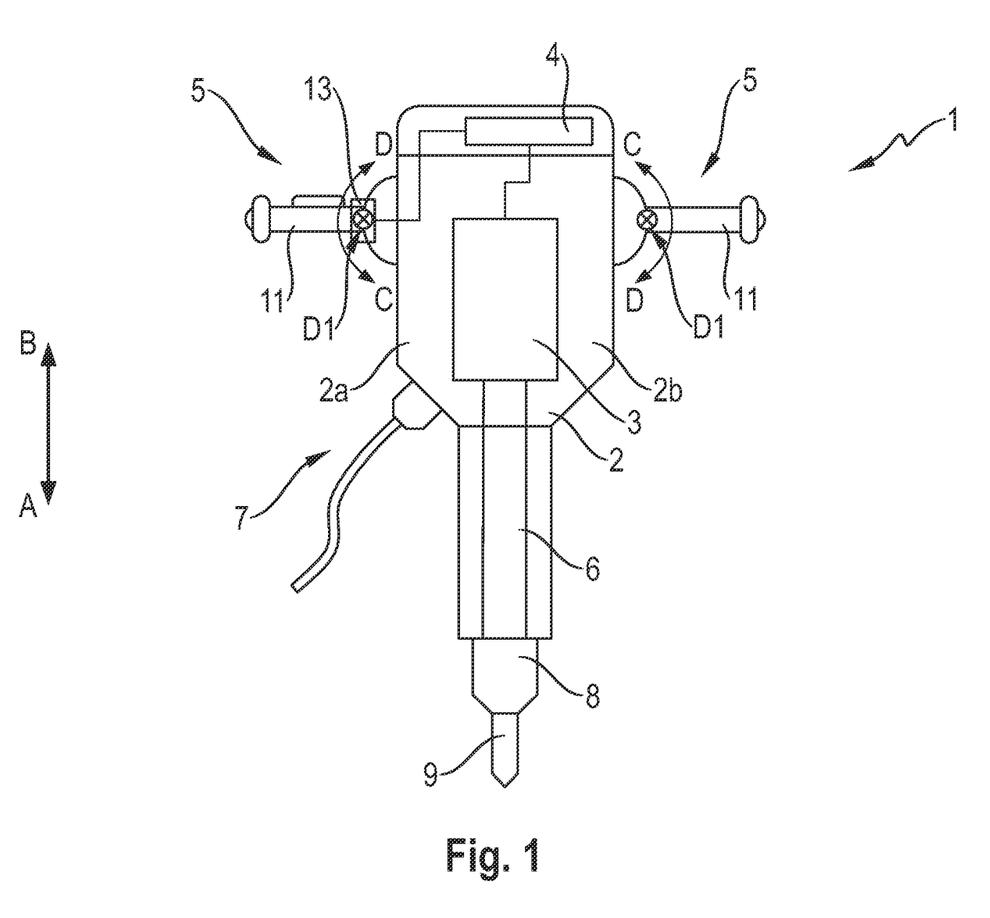
FIG. 1 shows a schematic front view of a power tool in the form of a chipping hammer.

FIG. 1 shows a power tool 1 according to the invention in the form of a chipping hammer. The power tool 1 can also be in the form of a hammer drill, a power drill, a saw, a sander or the like, however.

As indicated in FIG. 1, the power tool 1 in the form of a chipping hammer contains primarily a housing 2, a drive 3, a control device 4, a first and second handle apparatus 5, a transmission device 6, an energy supply device 7 and a tool fitting 8.

Positioned inside the housing are primarily the drive 3, the control device 4 and the transmission device 6. The drive 3 is in this case in the form of an electric motor. The electric motor is a brushless electric motor. Alternatively, the drive 3 is configured as an electric motor with carbon brushes. In all cases, the drive 3 configured as an electric motor contains a rotor and a stator. The rotor is positioned inside the stator such that the rotor can rotate relative to the stator. The rotor is driven by the stator such that the rotor can generate a torque. Neither the rotor nor the stator are shown in the figures.

Positioned at a lower end of the housing 2 of the power tool 1 is the tool fitting 8. By means of the tool fitting 8, a tool 9 can be fitted and held. In the figures, the tool 9 is in the form of a chisel.

Furthermore, the energy supply device 7 is provided on the first side wall 2a of the housing 2 of the power tool 1. In the given example of the power tool 1, the energy supply device 7 is a power grid connection and a power grid cable. A free end of the power grid cable can be connected to a power grid connection (also known as a power outlet, not shown in the figures). By means of the energy supply device 7, the power tool 1 and in particular the drive 3 in the form of an electric motor can be supplied with energy, for example with electrical energy.

According to an alternative embodiment of the power tool 1, which is not illustrated in the figures, the energy supply device 7 can also be in the form of a single rechargeable battery or of a plurality of rechargeable batteries. By means of one or more battery interfaces, the single rechargeable battery or plurality of rechargeable batteries is/are positioned on or in the housing 2 of the power tool 1.

As already mentioned above, the drive 3 is in the form of an electric motor in the present embodiment of the power tool 1. Alternatively, the drive 3 can also be a combustion engine. In this case, the energy supply device 7 is in the form of a fuel tank.

According to a further alternative embodiment of the power tool 1 according to the invention, the drive 3 can also be configured in the form of a pneumatic drive or compressor. In this case, the energy supply device 7 can be a compressed air connector or compressed air supply on or in the power tool 1.

The drive 3 configured as a brushless electric motor serves to generate a torque. By means of the transmission device 6, the torque generated by the drive 3 can be transmitted in the form of impact pulses to the tool fitting 8 and ultimately to the tool 9 in the form of a chisel. The transmission device 6 may also be referred to as an impact mechanism and contains primarily a piston-cylinder apparatus. In this case, the piston-cylinder apparatus contains a piston, which is move back and forth in the cylinder. The higher the frequency of the piston in the cylinder, the higher the impact pulse frequency and the more impact energy can be generated and ultimately transmitted to the tool.

The control device 4 is connected to the first and second handle apparatuses 5 and to the drive 3. Signals and communication data can thus be sent and received between the handle apparatuses 5, the drive 3 and the control device 4. The control device 4 serves for the open-loop and closed-loop control of the various functions of the power tool 1 and in particular for setting the parameters or operating parameters of the drive 3. By means of the control device 4, it is thus possible to set specifically the rotational speed the rotational speed value of the drive 3 in the form of an electric motor as parameter or operating parameter.

Figure 2A:
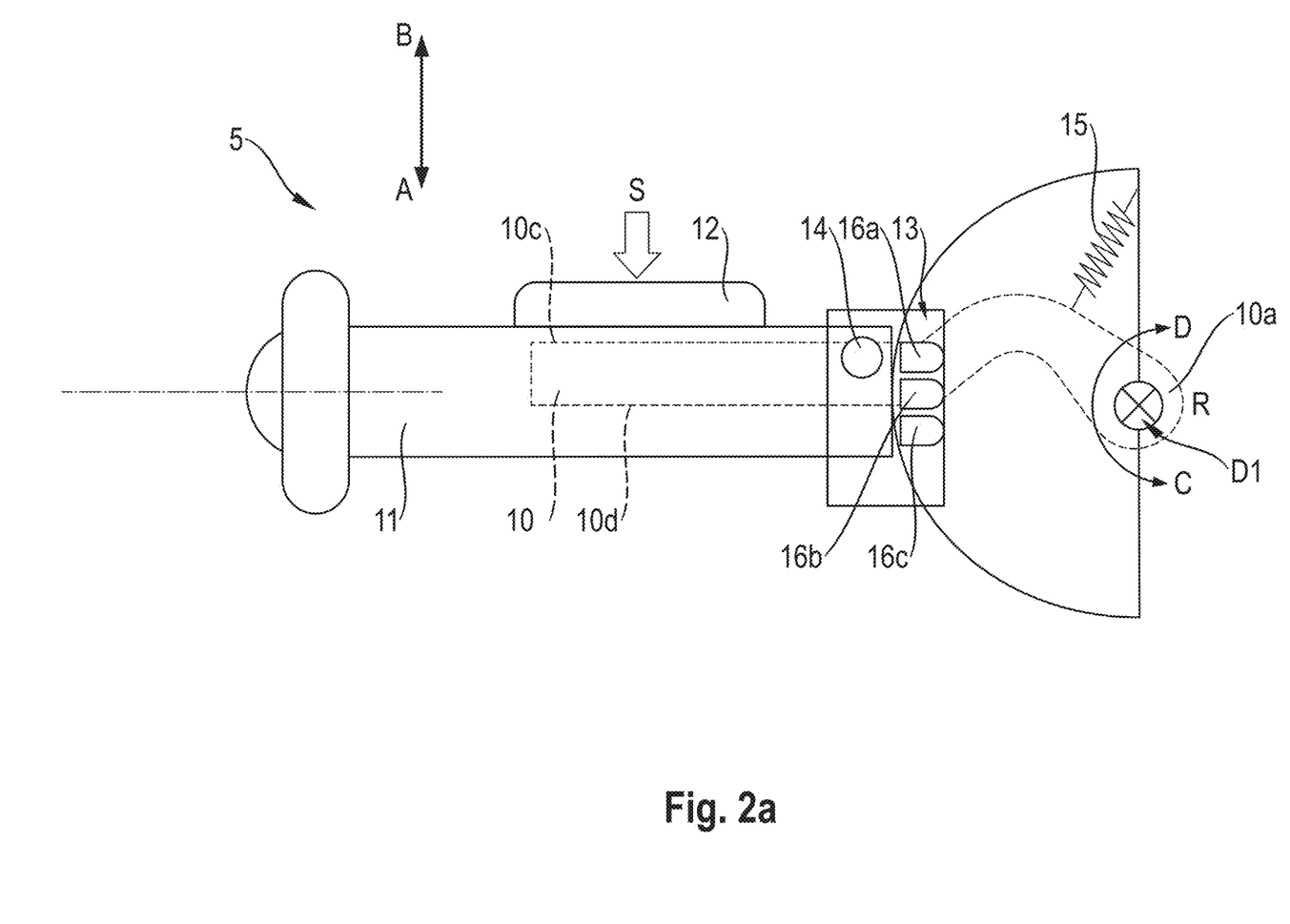
FIG. 2a shows a detail view of a handle apparatus in a first position.
Figure 2B:
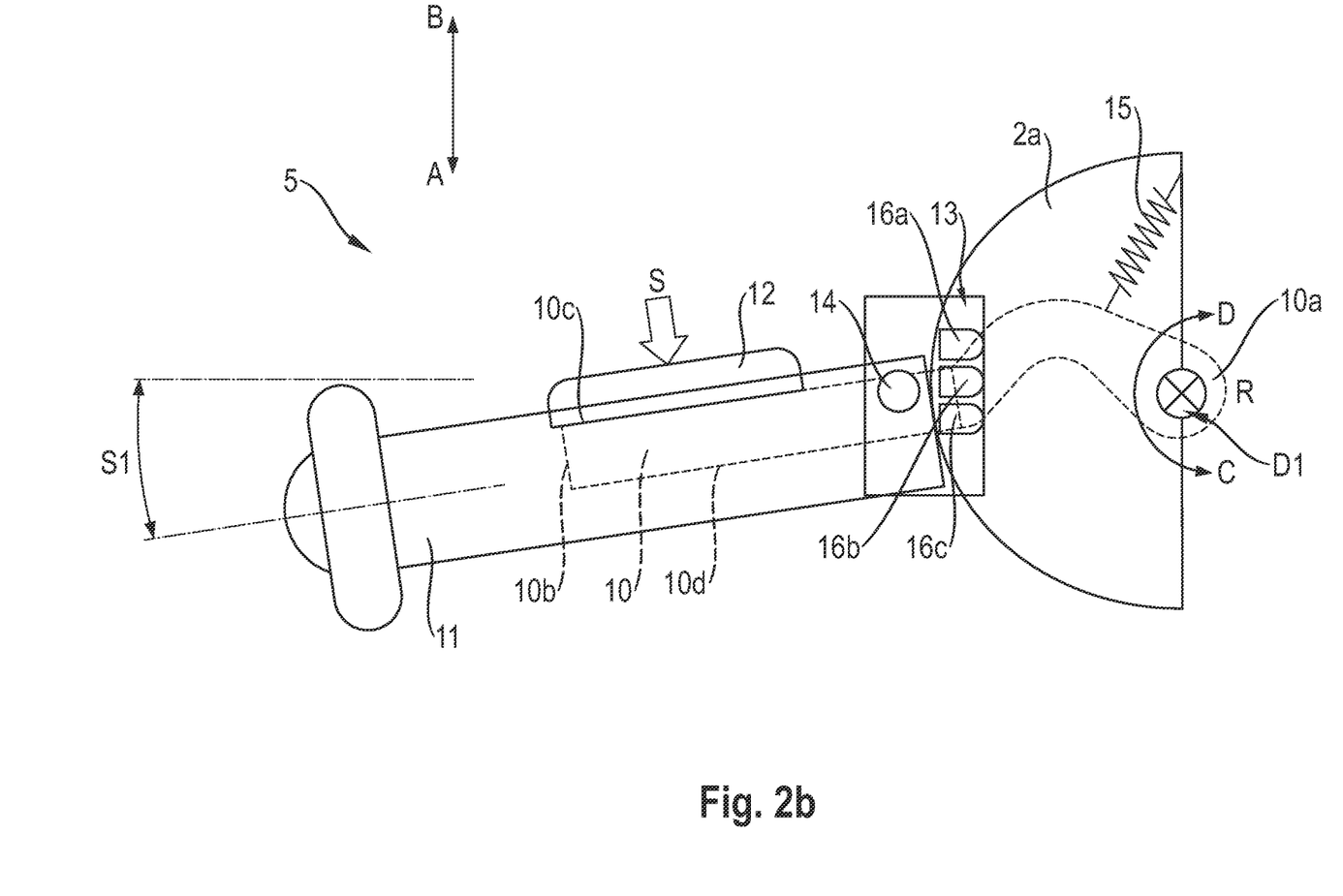
FIG. 2b shows a detail view of the handle apparatus in a second position.
Figure 2C:
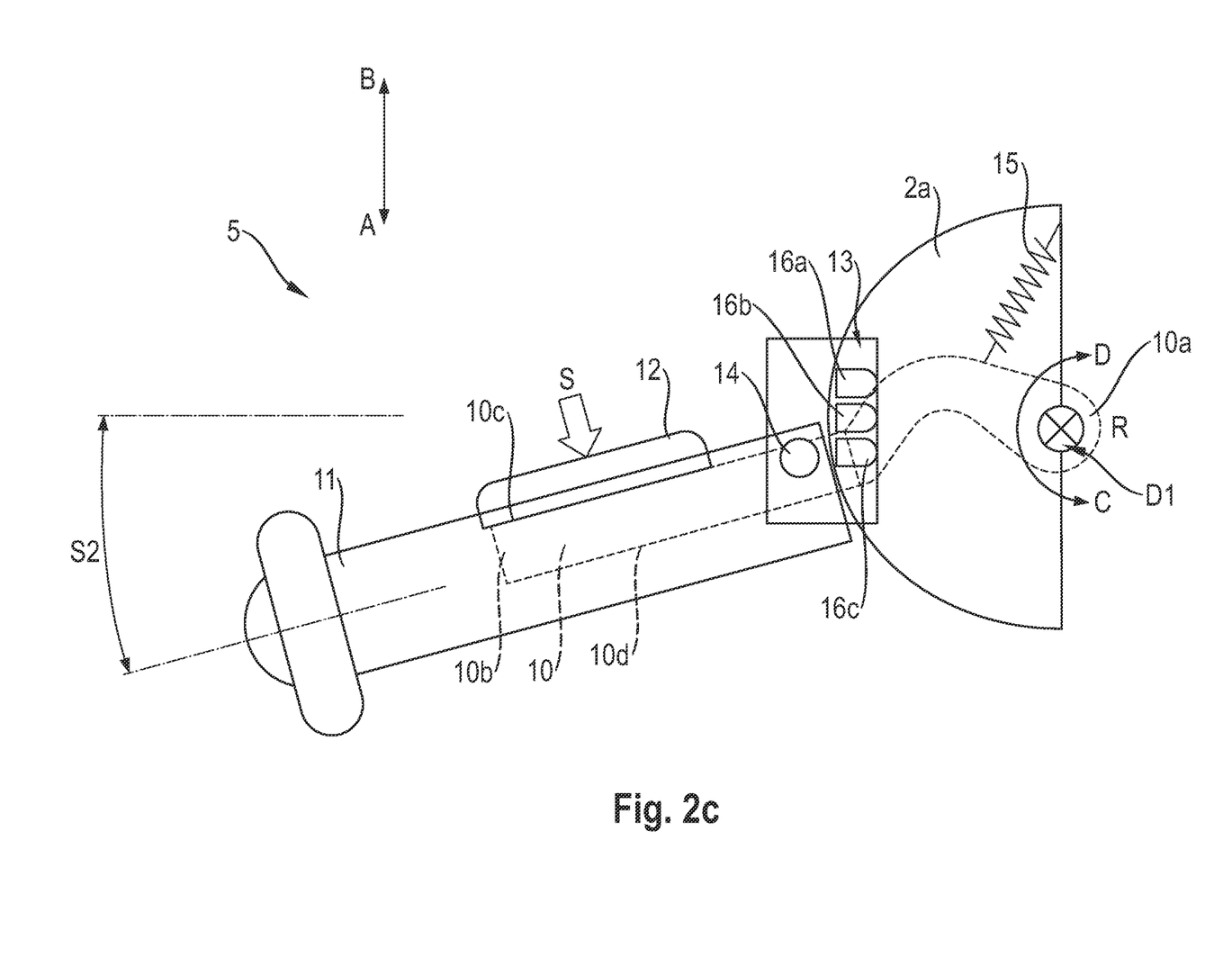
FIG. 2c shows a detail view of the handle apparatus in a third position.

The first handle apparatus 5 is positioned in a movable manner on a first side wall 2a of the housing 2 and the second handle apparatus 5 is positioned in a movable manner on a second side wall 2b of the housing 2. As shown in FIGS. 1 and 2, both the first and the second handle apparatus 5 each contain a lever element 10 and a handle piece 11. Each lever element 10 of the first and second handle apparatuses 5 is accordingly mounted in a pivotable manner in a direction of rotation C or D via a corresponding pivot point D1. The first and second handle apparatuses 5 serve for the holding and guiding of the power tool 1 by a user.

FIGS. 2a to 2c illustrate the handle apparatus 5 in the form of an exemplary embodiment. The handle apparatus 5 in this case contains primarily a lever element 10, a handle piece 11, an activation element 12, a sensor device 13 and a signal transmitter 14.

The activation element 12 in the form of an actuating switch serves for activating the drive 3 of the power tool 1. The activation element 12 can be moved reversibly from a first position to a second position by exertion of a force in a direction S. In FIG. 2a, the activation element 12 is shown in the first position, i.e. in a nonpressed state. The first position corresponds in this case to the uppermost position. The drive 3 is activated as soon as the activation element 12 is moved away from the first position into the second position. In FIGS. 2b and 2c, the activation element 12 is illustrated in each case in the second position, i.e. in a pressed state. The activation element 12 is connected to the control device 4 such that signals can be exchanged between the activation element 12 and the control device 4. The connection between the activation element 12 and the control device 4 is not illustrated in the figures. The particular position, i.e. the first or second position, of the activation element 12 is transmitted to the control device 4 by means of a corresponding signal.

Alternatively, the first and second positions can be determined from the corresponding signals in the control device 4.

When the activation element 12 is in the second position, only the drive 3 of the power tool 1 is activated. The transmission device 6 in the form of an impact mechanism device is not activated or started just by the activation element 12 being pressed in the arrow direction S.

The sensor device 13 is connected to the control device 4 such that signals, data and information can be exchanged between the sensor device 13 and the control device 4. Alternatively, the sensor device 13 can also be integrated in a circuit board of the control device. The circuit board is not shown in the figures.

The lever element 10 is substantially in the form of an elongate lever arm having a first end 10a and a second end 10b and having a top side 10c and underside 10d. The lever element 10 is mounted at the first end 10a so as to be reversibly pivotable in a direction of rotation C or D with respect to the housing 2 of the power tool 1 via the pivot point D1. When a force is exerted in the direction A on the top side 10c of the lever element 10, the lever element 10 pivots about the pivot point D1 in the direction of rotation C. When a force is no longer exerted on the top side 10c of the lever element 10, the lever element 10 pivots back into the starting position about the pivot point D1 in the direction of rotation D by means of a first spring element 15. The first spring element 15 can in this case be configured in the form of a spiral spring or torsion bar spring.

The signal transmitter 14 is firmly connected to the lever element 10 and is configured in the form of a magnet. The magnet may be a permanent magnet. As shown in FIGS. 2a to 2c, the signal transmitter 14 in the form of a magnet is positioned on the lever element 10. As a result of being positioned on the lever element 10, the signal transmitter 14 can be moved relative to the housing 2 of the power tool 1.

The sensor device 13 is positioned on the first side wall 2a of the housing 2 of the power tool 1 and contains primarily a first, second and third Hall sensor 16a, 16b, 16c.

Alternatively, rather than the Hall sensors, it is also possible to use at least one 3D Hall sensor.

As shown in FIGS. 2a to 2c, the three Hall sensors 16a, 16b, 16c are positioned on the housing 2 of the power tool 1 one below another in the direction A. The Hall sensors 16a, 16b, 16c are positioned on the housing 2 of the power tool 1 such that at all times at least one of the three Hall sensors 16a, 16b, 16c can detect the position of the signal transmitter 14 in the form of a magnet when the lever element 10 is pivoted in the direction of rotation C or D.

According to an alternative embodiment, it is also possible for more or fewer than three Hall sensors to be provided. According to a further alternative embodiment, rather than the three Hall sensors, it is also possible for only one 3D Hall sensor to be provided. The Hall sensor may be an analog sensor.

As already mentioned above, in FIG. 2a, the activation element 12 has not been pressed in the direction A and the handle apparatus 5 has not been pivoted in the direction C by exertion of a force. The first (i.e. uppermost) Hall sensor 16a of the sensor device 13 senses the proximity of the signal transmitter 14 in the form of a magnet. The sensor device 13 sends a corresponding signal to the control device 4 in order to inform the control device 4 that no force is being exerted on the handle apparatus 5. In this state, neither the drive 3 nor the transmission device 6 is activated. Consequently, no impact energy is transmitted to the tool 9. For example, a tool change could be carried out safely in this state.

In FIG. 2a, the handle apparatus 5 is illustrated and in a first position. In this first position, the handle apparatus 5 and signal transmitter 14 are located in the uppermost position in the direction B.

The signal transmitter 14 in the form of a magnet is in this case positioned such that the first Hall sensor 16a (i.e. the uppermost Hall sensor in the direction B) of the sensor device 13 can sense the magnet. The sensor device 13 thus senses that the signal transmitter 14 and the handle apparatus 5 are in the uppermost position. When the sensor device 13 senses the uppermost position of the handle apparatus 5 by means of the first Hall sensor 16a, a corresponding signal is sent to the control device 4. The signal informs the control device 4 that a force is not yet being exerted on the handle apparatus 5 in the direction A by the user.

A user (not shown) exerts a first force on the activation element 12 and the handle apparatus 5 in the direction A. As a result, the activation element 12 is moved from the first position into the second position. The drive 3 is then activated, i.e. the rotor of the drive 3 rotates and generates a torque. At the same time, as a result of the exertion of the first force in the direction A, the handle apparatus 5 and thus the lever element 10 are pivoted about the first pivot point D1 in the direction of rotation C.

FIG. 2b indicates that enough force is being exerted on the handle apparatus 5 and the lever element 10 for the handle apparatus 5 to be located from the first position (i.e. the uppermost position in the direction B) into a second position (i.e. a middle position—approximately between the uppermost and bottommost positions). The signal transmitter 14 in the form of a magnet is in this case positioned such that the second (middle) Hall sensor 16b of the sensor device 13 can sense the magnet. The sensor device 13 thus senses that the handle apparatus 5 is in a middle position. When the sensor device 13 senses the middle position of the handle apparatus 5 by means of the second Hall sensor 16b, a corresponding signal is sent to the control device 4. The signal informs the control device 4 that a medium force is being exerted on the handle apparatus 5 by the user. The distance between the first and second positions of the signal transmitter 14 corresponds to a first distance S1. The distance S1 can also be referred to as a circular arc.

As a result of the first position and the second position of the signal transmitter 14 being sensed by means of the sensor device 13, the control device 4 determines the difference between a maximum distance S2 (see FIG. 2c) of the lever element 10 and the first determined distance S1. The maximum distance S2 corresponds in this case to the bottommost or lowest position of the handle apparatus 5 in the direction A, cf. FIG. 2c. The more Hall sensors 16a, 16b, 16c there are in the sensor device 13, the more accurately the position of the signal transmitter 14 relative to the sensor device 13 and ultimately the difference between a maximum distance S2 of the lever element 10 and the first determined distance S1 can be determined. As a result of the alternative use of a 3D Hall sensor rather than the three Hall sensors, a maximally possible continuously linear position determination can be carried out over the entire (i.e. the maximally possible) distance S2.

The control device 4 sets a first rotational speed for the drive 3 when the determined difference between the maximum distance S2 of the lever element 10 and the determined distance S1 corresponds at least to a predetermined threshold value. In the present exemplary embodiment, the threshold value is 50%. Thus, if the first distance S1 is identified as being 50% or half of the maximum distance S2, the control device 4 sets a rotational speed or a rotational speed value for the drive 3, which corresponds to 50% or half of the maximum rotational speed of the drive 3. In other words: if the control device 4 identifies that the handle apparatus 5 has been pressed along half or 50% of the possible distance in the direction A, half or 50% of the maximally possible rotational speed for the drive 3 is set. As a result of the rotational speed being set at half or 50% of the maximally possible rotational speed for the drive 3, only half or 50% of the maximally possible impact frequency and half or 50% of the maximally possible power is generated by the transmission device 6.

If the handle apparatus 5 is in the first position, i.e. has been moved along half (50%) of the maximum distance S2, and a predetermined period of time has elapsed after this second position of the handle apparatus 5 has been reached, a second rotational speed for the drive 3 is set by the control device 4. In the present exemplary embodiment, the second rotational speed is the maximum rotational speed of the drive 3. The maximum rotational speed corresponds in this case to the nominal rotational speed of the drive 3. The predetermined period of time is one second in this exemplary embodiment. In other words: the user moves the handle apparatus 5 along half of the possible distance S2 in the direction A and a first rotational speed is set, and after one second a second, higher rotational speed is set. As a result of the higher rotational speed, a correspondingly higher impact frequency and power are generated by the transmission device 6 and transmitted to the tool 9.

Consequently, the nominal rotational speed, or the full or maximum rotational speed, for the drive 3 is set either by the sudden setting of the handle apparatus 5 from the first position into the third position, cf. FIG. 2c, or by the setting of the handle apparatus 5 from the first position into the second position and additionally after the predetermined period of time has elapsed after the second position has been reached.

In FIG. 2c, a second force is exerted on the handle apparatus 5 in the direction A. The second force is in this case greater than the first force. As can be seen in FIG. 2c, the activation element 12 continues to be in the second (i.e. pressed) position. The drive 3 continues to be activated by the activation element 12 being pressed in the direction S. As a result of the second (i.e. increased) force being exerted on the handle apparatus 5 in the direction A, the lever element 10 is pivoted further in the direction of rotation C than in FIG. 2b. The lever element 10 is in this case pivoted to such an extent that the handle apparatus 5 moves into a third position and the signal transmitter 14 positioned on the lever element 10 is at the level of the third (i.e. bottommost) Hall sensor 16c. The sensor device 13 thus senses that maximum pressure is being exerted on the handle apparatus 5 and the handle apparatus 5 is in a third or lower (i.e. bottommost) position. When the sensor device 13 senses the bottommost position of the handle apparatus 5 by means of the third Hall sensor 16c, a corresponding signal is sent to the control device 4. The signal informs the control device 4 that a maximum force is being exerted on the handle apparatus 5 by the user. The control device 4 controls the drive 3 in the form of an electric motor such that, depending on the maximum force exertion on the handle apparatus 5, a second rotational speed is set for the drive 3. The second rotational speed value is in this case higher than the first rotational speed value. The second rotational speed specifies a second value of impact frequency and power from the transmission device 6 to the tool 9.

Thus, the setting of the maximally possible rotational speed for the drive 3 or for the setting of the maximally possible impact frequency and power of the transmission device 6 is either brought about in that the handle apparatus 5 is moved directly from the first position into the third position (cf. FIGS. 2a and 2c) or in that the handle apparatus 5 is moved into the second position (cf. FIG. 2b) and remains there for one second.

The control device 4 is configured to set a particular rotational speed for the drive 3. To this end, first of all the sensor device 13 senses a first and second position of the lever element 10 with the signal transmitter 14 relative to the sensor device 13. The second position is in this case below the first position in the direction A and therefore the first position is closer to the tool 9. The data of the first and second positions are sent from the sensor device 13 to the control device 4.

The third rotational speed is likewise higher than the first and second rotational speeds. As a result of the increased (i.e. third) rotational speed for the drive 3, increased impact energy is also generated by the transmission device 6 and transmitted to the tool 9.

If the handle device 5 has been moved back into the second or first position (in the direction B) as a result of the exertion of a correspondingly lower force in the direction A, the third rotational speed is accordingly reduced to the second or first rotational speed again.

LIST OF REFERENCE SIGNS

1 Power tool
2 Housing
2a First side of the housing
2b Second side of the housing
3 Drive
4 Control unit
5 Handle apparatus
6 Transmission device
7 Energy supply device
8 Tool fitting
9 Tool
10 Lever element
10a First end of the lever element
10b Second end of the lever element
10c Top side of the lever element
10d Underside of the lever element
11 Handle piece
12 Activation element
13 Sensor device
14 Signal transmitter
15 First spring element
16a First Hall sensor
16b Second Hall sensor
16c Third Hall sensor
D1 Pivot point
S1 First distance
S2 Maximum distance

What is claimed is:

1. A method for open-loop and closed-loop control of a power tool containing a drive, a controller, a sensor, a transmission device and a handle, wherein the handle contains a lever with a signal transmitter, the lever being pivotable relative to the sensor, the method comprising:
   sensing a first position and a second position of the signal transmitter by the sensor, wherein a distance between the first position and the second position corresponds to a first determined distance;
   determining a difference between a maximum distance of the lever element and the first determined distance;
   setting a first rotational speed for the drive when the determined difference between the maximum distance of the lever and the first determined distance corresponds at least to a first predetermined threshold value; and
   setting a second rotational speed for the drive when a predetermined period of time has elapsed since the second position of the signal transmitter was reached.

2. The method as recited in claim 1 wherein the first rotational speed for the drive corresponds to a predetermined proportion of a maximum rotational speed for the drive.

3. The method as recited in claim 2 wherein the predetermined proportion is between 60% to 80%.

4. The method as recited in claim 3 wherein the predetermined proportion is 75%.

5. The method as recited in claim 1 wherein the first predetermined threshold value corresponds to a predetermined proportion of the maximum distance.

6. The method as recited in claim 5 wherein the predetermined proportion is between 25% to 75%.

7. The method as recited in claim 6 wherein the predetermined proportion is 50%.

8. The method as recited in claim 1 wherein the predetermined period of time corresponds to a value of between 0.75 seconds and 2 seconds.

9. The method as recited in claim 1 wherein the predetermined period of time is 1 second.

10. The method as recited in claim 1 wherein the power tool is a chipping hammer.

11. The method as recited in claim 10 wherein the chipping hammer has a housing the drive, controller and transmission device.

12. The method as recited in claim 11 wherein the housing has a lower end, a tool fitting being positioned at the lower end and the chipping hammer having a chisel in the tool fitting.

13. The method as recited in claim 11 wherein the handle is positioned on a first side wall of the housing, and the chipping hammer has a second handle on a second side wall of the housing.

14. The method as recited in claim 13 wherein the second handle is pivotable.

15. The method as recited in claim 1 wherein the handle has an activation element in the form of a switch for activating the drive, the switch movable between a first nonpressed position and a second pressed position.

16. The method as recited in claim 15 wherein the setting of the first rotational speed for the drive occurs only after a first force is exerted on both the switch and the handle.

* * * * *